United States Patent [19]

Andrews et al.

[11] Patent Number: 5,251,130

[45] Date of Patent: Oct. 5, 1993

[54] METHOD AND APPARATUS FOR FACILITATING CONTEXTUAL LANGUAGE TRANSLATION WITHIN AN INTERACTIVE SOFTWARE APPLICATION

[75] Inventors: Gregory P. Andrews; Phillip C. Schloss, both of Rochester, Minn.

[73] Assignee: International Business Machines Corporation, Armonk, N.Y.

[21] Appl. No.: 687,257

[22] Filed: Apr. 18, 1991

[51] Int. Cl.$^5$ .............................................. G06F 15/38
[52] U.S. Cl. ............................................... 364/419.03
[58] Field of Search ................ 364/419; 395/155, 157

[56] References Cited

U.S. PATENT DOCUMENTS

| | | | |
|---|---|---|---|
| 4,566,078 | 1/1986 | Crabtree | 364/900 |
| 4,595,980 | 6/1986 | Innes | 364/419 |
| 4,615,002 | 9/1986 | Innes | 364/419 |
| 4,674,065 | 6/1987 | Lange et al. | 364/419 |
| 4,731,735 | 3/1988 | Borgendale et al. | 364/419 |
| 4,783,759 | 11/1988 | Borgendale et al. | 364/419 |
| 4,814,988 | 3/1989 | Shiotani et al. | 364/419 |
| 4,845,665 | 7/1989 | Heath et al. | 395/157 |
| 4,962,452 | 10/1990 | Nogami et al. | 364/419 |
| 5,067,070 | 11/1991 | Miyao et al. | 364/419 |
| 5,119,475 | 6/1992 | Smith et al. | 395/160 |
| 5,119,476 | 6/1992 | Texier | 395/157 |
| 5,201,042 | 4/1993 | Weisner et al. | 364/419 |

OTHER PUBLICATIONS

Miscellaneous Search Report Results, "Hybridization of the Mouse," M. Togashi, Trans. Inf. Process, Soc. Jpn. (Japan), vol. 27, No. 2, pp. 266–268.
Miscellaneous Search Report Results, "The User Interface of Adagio, A Robotics Multitasking Multiprocessor Workstation" (In Proceedings of the 1st International Conference on Computer Workstations (Cat. No. 85CH2228-5), San Jose, Calif. USA, Nov. 11–14, 1985), P. P. Tanner et al, IEEE Compt. Soc. Press. Washington, D.C. USA, xii+303 pp., pp. 90–98, 1985, 23 Ref.
Miscellaneous Search Report Results, "Method for Concurrent Support of Keyboard and Mouse," R. M. Bateman, et al, TDB Apr. 1988 p. 100.

Primary Examiner—Roy N. Envall, Jr.
Assistant Examiner—Jennifer L. Hazard
Attorney, Agent, or Firm—Andrew J. Dillon

[57] ABSTRACT

A method and apparatus for facilitating the contextual translation of textual entries within an interactive software application which is executable within a data processing system. A contextual translation procedure is created and inserted into a selected interactive software application. During execution of the selected interactive software application, display screens containing textual entries are typically generated. Upon encountering a screen requiring translation an operator may invoke the contextual translation procedure, causing a translation viewport to be displayed. Individual translate phrases within the display screen are then selected and displayed within the translation viewport. A contextual translation may then be entered into the translation viewport by a translator and displayed therein in proximity to the selected translatable phrase. Upon completion of translation of a selected phrase, the newly created translation is substituted for the existing phrase within the display screen, automatically altering the display area, if necessary, and a subsequent translatable phrase may be selected. In this manner, translation may occur during actual execution of an interactive software application, permitting contextual variations to be observed and compensated for.

7 Claims, 6 Drawing Sheets

METHOD AND APPARATUS FOR FACILITATING CONTEXTUAL LANGUAGE TRANSLATION WITHIN AN INTERACTIVE SOFTWARE APPLICATION

BACKGROUND OF THE INVENTION

1. Technical Field

The present invention relates in general to the field of interactive software applications and in particular to methods for facilitating language translation of textual entries within interactive software applications. Still more particularly, the present invention relates to a method and apparatus for facilitating contextual language translation of textual entries within an interactive software application during actual execution of the application.

2. Description of the Related Art

The global nature of the world today has created an increased market for computer hardware and software applications which may be simply translated into a large number of foreign languages. Indeed, National Language Support (NLS) is increasingly important as the market for data processing systems is ever expanding. While the demands upon hardware systems are minimal and are often solved by the provision of a small number of special keyboard characters, the large textual content of many software applications leads to a more difficult problem.

The translation of a software application into a foreign language for utilization in a foreign market is generally accomplished utilizing a batch process wherein the text may be edited with a text editor. The resultant translation must then be verified with a simulation of the display screens of the software application or by executing the program after translation has occurred. Additional changes brought about by variations induced due to the contextual nature of a text entry or as a result of simple size differences between a textual entry in two different languages must then be edited in the batch process and the verification program repeated.

The simulation of computer program external interfaces in order to permit the interface to be evaluated prior to encoding the software is the primary method for creating an interactive software application in a foreign language. For example, U.S. Pat. No. 4,845,665, issued to Heath et al. and assigned to the assignee herein discloses a technique for the simulation of computer program external interfaces which is intended to permit users to evaluate the design and alter the display screens prior to committing to an encoding of the software code.

In view of the above, those skilled in the art will appreciate that a translation technique wherein textual entries within an interactive software application might be examined in context during the translation process would greatly enhance the quality of the resultant translation. By observing the textual entries within the context of the display screen and by observing the physical limitations of the field or display area in which the textual entry is to be displayed, a translator may simply and efficiently create an optimal language translation for converting the textual entries of an interactive software application into a selected foreign language.

SUMMARY OF THE INVENTION

It is therefore one object of the present invention to provide an improved method of dealing with interactive software applications.

It is another object of the present invention to provide an improved method and apparatus for facilitating translation of textual entries within interactive software applications into foreign languages.

It is yet another object of the present invention to provide an improved method and apparatus for permitting contextual language translation of textual entries within interactive software applications during actual execution of the applications.

The foregoing objects are achieved as is now described. The method and apparatus of the present invention may be utilized to facilitate the contextual translation of textual entries within an interactive software application which is executable within a data processing system. A contextual translation procedure is created and inserted into a selected interactive software application. During execution of the selected interactive software application, display screens containing textual entries are typically generated. Upon encountering a screen requiring translation an operator may invoke the contextual translation procedure, causing a translation viewport to be displayed. Individual translate phrases within the display screen are then selected and displayed within the translation viewport. A contextual translation may then be entered into the translation viewport by a translator and displayed therein in proximity to the selected translatable phrase. Upon completion of translation of a selected phrase, the newly created translation is substituted for the existing phrase within the display screen automatically altering the display area, if necessary, and a subsequent translatable phrase may be selected. In this manner, translation may occur during actual execution of an interactive software application, permitting contextual variations to be observed and compensated for.

In an alternate embodiment, the contextual translation procedure is not included within the software application but is made available to the software application via an external subroutine, such as a dynamic link library in an OS/2 environment.

BRIEF DESCRIPTION OF THE DRAWING

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
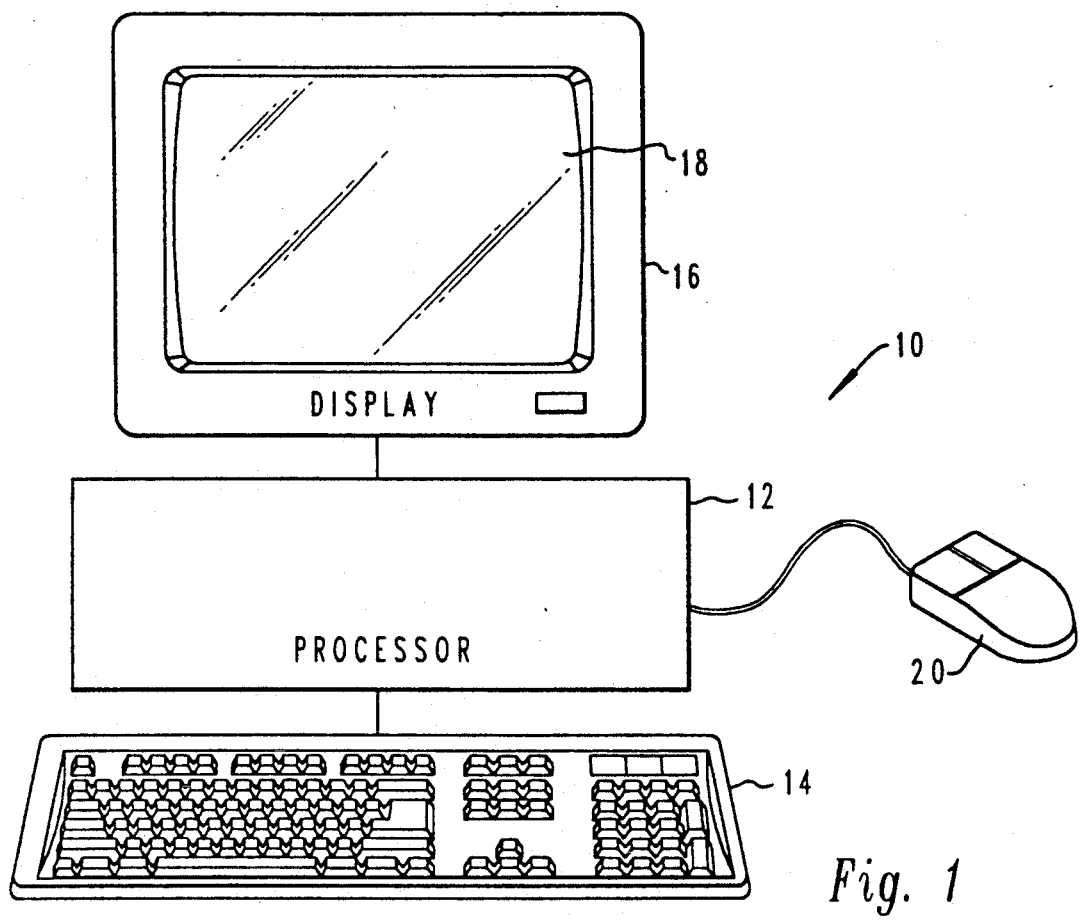
FIG. 1 is a pictorial representation of a data processing system which may be utilized to implement the method and apparatus of the present invention.

With reference now to the figures and in particular with reference to FIG. 1, there is depicted a pictorial representation of a data processing system 10 which may be utilized to implement the method and apparatus of the present invention. As is illustrated, data processing system 10 includes a processor 12 Which is coupled to keyboard 14 and display device 16 in a manner well known in the art. Display device 16 includes a display screen 18. Additionally, a graphic pointing device such as mouse 20 is also coupled to processor 12 and may be utilized, in a so-called "graphic user interface" to enter operator inputs and commands to processor 12.

Those skilled in the art upon reference to the foregoing will appreciate that data processing system 10 may be implemented by utilizing any suitable computer including the so-called "personal computer" or a work station coupled to a mainframe host computer, such as the Application System/400, manufactured by International Business Machines Corporation. One other example of a data processing system which may be utilized to implement the method and apparatus of the present invention is the International Business Machines Corporation Personal Computer PS/2.

As those skilled in the art will appreciate, data processing system 10 may be utilized to execute interactive software applications, such as text processors, spreadsheets, graphic processors or the like. As is common in such interactive software applications, display screens including multiple textual entries for commands, instructions and the like are periodically displayed during the execution of such applications utilizing display screen 18 Of display device 16. Thus, in order to facilitate the utilization of an interactive software application by a foreign national it is necessary to translate a large number of textual entries into the foreign language for display within display device 18.

Figure 2:
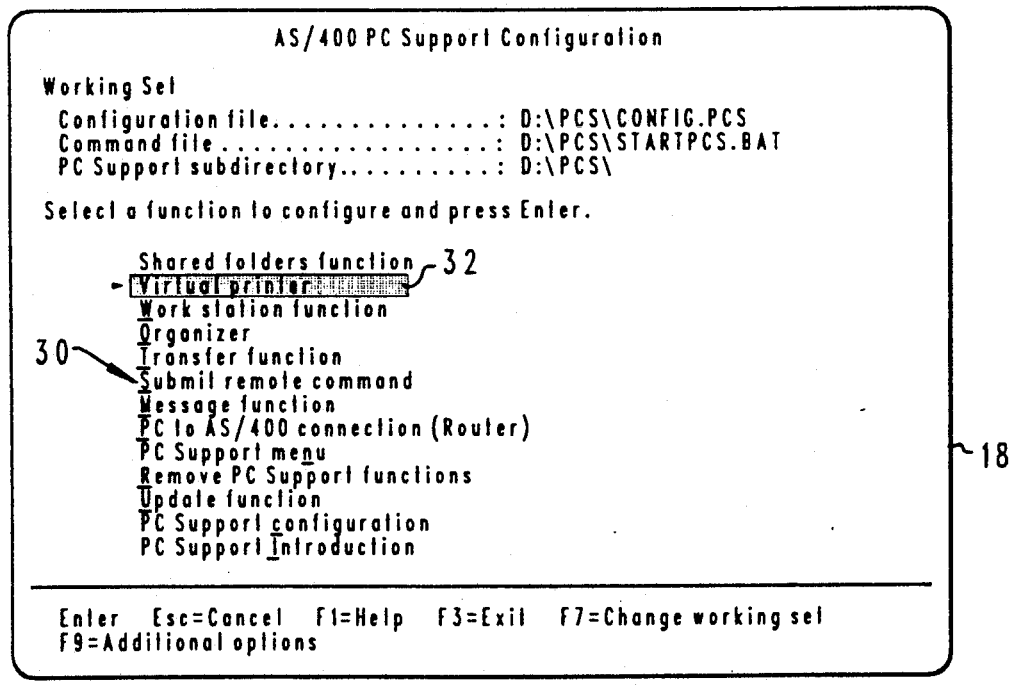
FIG. 2 is a pictorial representation of a display screen of an interactive software application executing within the data processing system of FIG. 1.

Referring now to FIG. 2, there is depicted a pictorial representation of a display screen 18 illustrating one output screen of an interactive software application which is executing within data processing system 10 of FIG. 1. As illustrated, display screen 18 includes a column of function listings 30 which represent various functions and command within the interactive software application depicted which may be selected by a user either graphically utilizing mouse 20 (see FIG. 1) or by means of keyboard 14. One selected function 32 is referenced and the textual entry contained therein is the function "Virtual printer." Thus, a user desiring to select the virtual printer function will graphically or textually indicate the function at reference numeral 32 within column 30.

Figure 3:
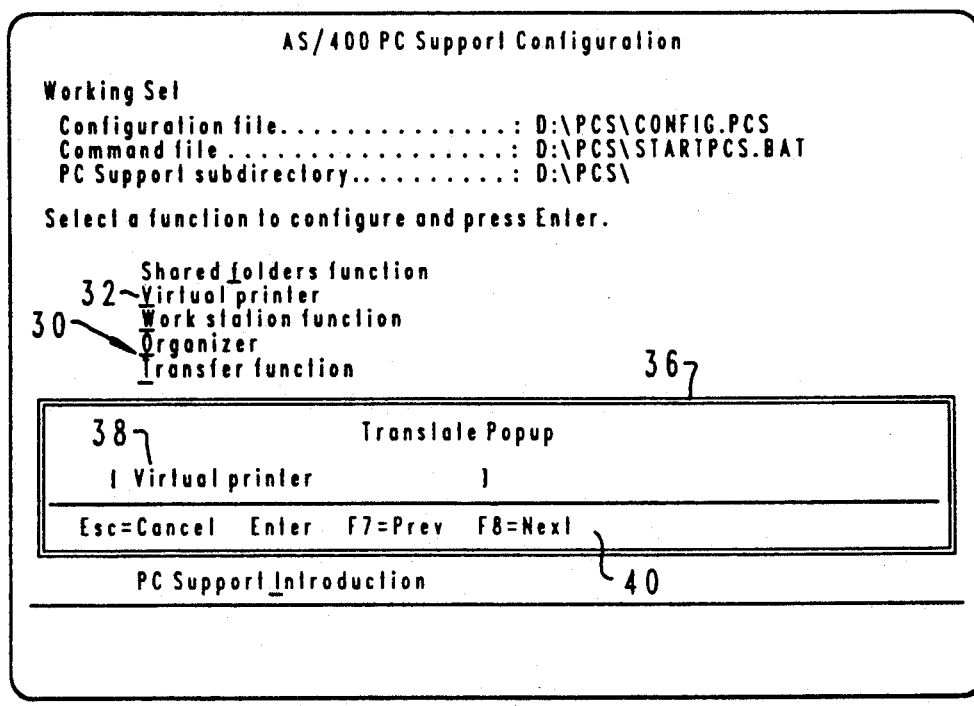
FIG. 3 is a pictorial representation of the selection of a textual entry from the display screen of FIG. 2 for translation utilizing the method and apparatus of the present invention.

With reference now to FIG. 3, there is depicted a pictorial representation of the selection of a textual entry for translation utilizing the method and apparatus of the present invention. As is illustrated, display screen 18 now includes a separate viewport, translation viewport 36. Translation viewport 36 is preferably invoked utilizing a specific keystroke sequence and is created utilizing a contextual translation procedure which is established in a manner which will be explained in greater detail herein.

As illustrated, translation viewport 36 includes a translatable phrase field 38 and a command bar 40. Appearing within translatable phrase field 38 is a translatable phrase from column 30 within display screen 18. Specifically, selected function 32 indicating "Virtual printer" is displayed within translatable phrase field 38. In accordance with the depicted embodiment of the present invention upon the initial invocation of translation viewport 36, the first translatable phrase within display screen 18 will be displayed within translatable phrase field 38; however, for purposes of illustration function 32 has been selected.

Those skilled in the art will appreciate that translation viewport 36 may be displayed within display screen 18 at a selected location proximate to function 32 such that the context in which function 32 is displayed within display screen 18 may be readily apparent. Thus, the selection of a translatable phrase from the lower reaches of column 30 will result in the display of translation viewport 36 at a different location within display screen 18.

Having selected a translatable phrase from display screen 18, in a manner which will be explained in greater detail below, a user may then utilize the editing keyboard 14 (see FIG. 1) to type in a translation for the displayed translatable phrase in a manner well known in most text editing applications.

Figure 4:
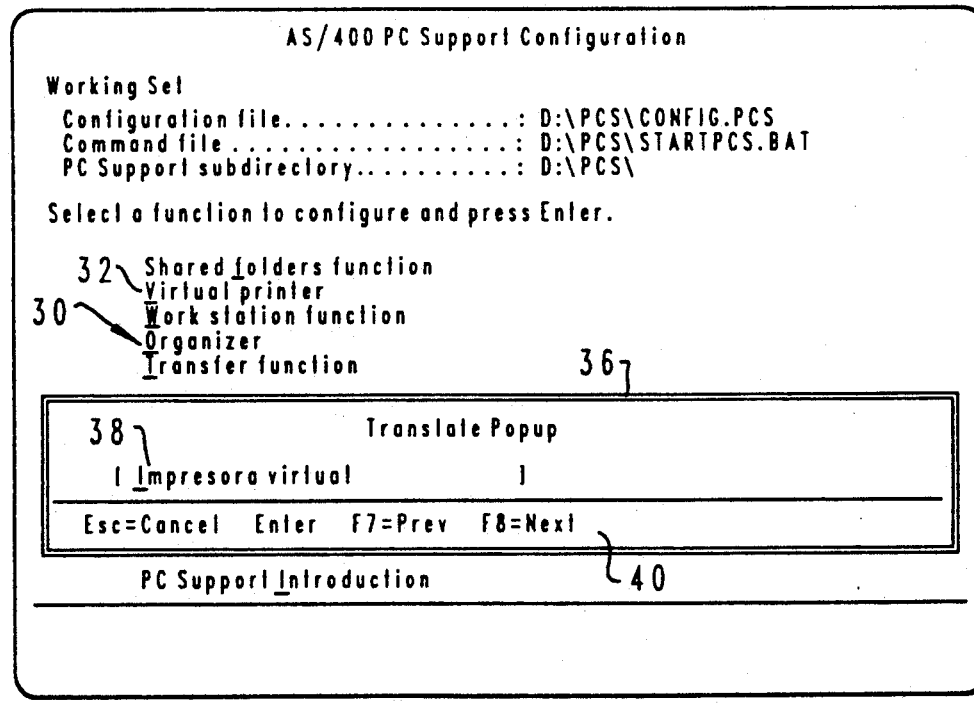
FIG. 4 is a pictorial representation of a translation being input into an interactive software application in accordance with the method and apparatus of the present invention.

Referring now to FIG. 4, there is depicted a pictorial representation of translation viewport 36 after a translation has been input into the interactive software application depicted therein. As now depicted within translatable phrase field 38 of FIG. 4, the phrase "Impresora virtual" has been typed into translation phrase field 38. "Impresora virtual" is the Spanish translation for the phrase "Virtual printer" and by typing that translation into translation viewport 36 while translation viewport 36 is displayed in proximity to function 32 the translator may observe not only the contextual elements of function 32, but also the physical size limitations of the display containing that phrase.

Figure 5:
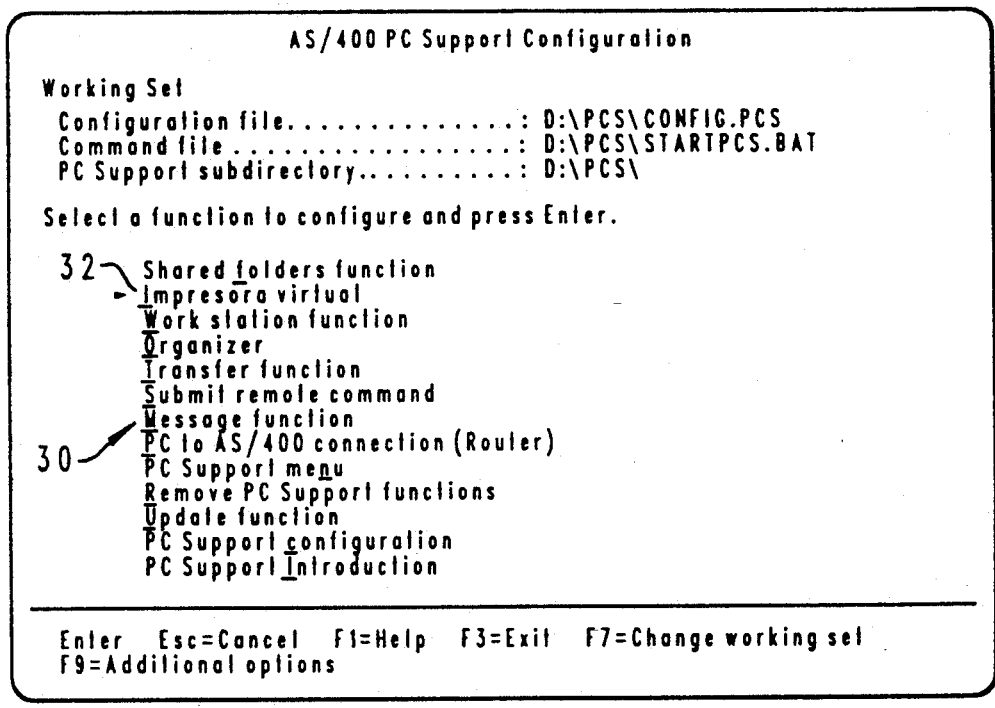
FIG. 5 is a pictorial representation of the display screen of FIG. 2 after contextual language translation of a textual entry in accordance with the method and apparatus of the present invention.

With reference now to FIG. 5, there is depicted a pictorial representation of the display screen of FIG. 2, after contextual language translation of function 32 has occurred. As illustrated in FIG. 5, display screen 18 now includes the phrase "Impresora virtual" at function 32 within column 30. This is accomplished, after typing in a translation within translatable phrase field 38 by selecting the enter key of keyboard 14 (see FIG. 1). Thereafter, while the interactive software application depicted within display screen 18 is being executed, the translator has created a contextually correct translation which is physically adapted to replace the English phrase which has been removed.

Figure 6A:
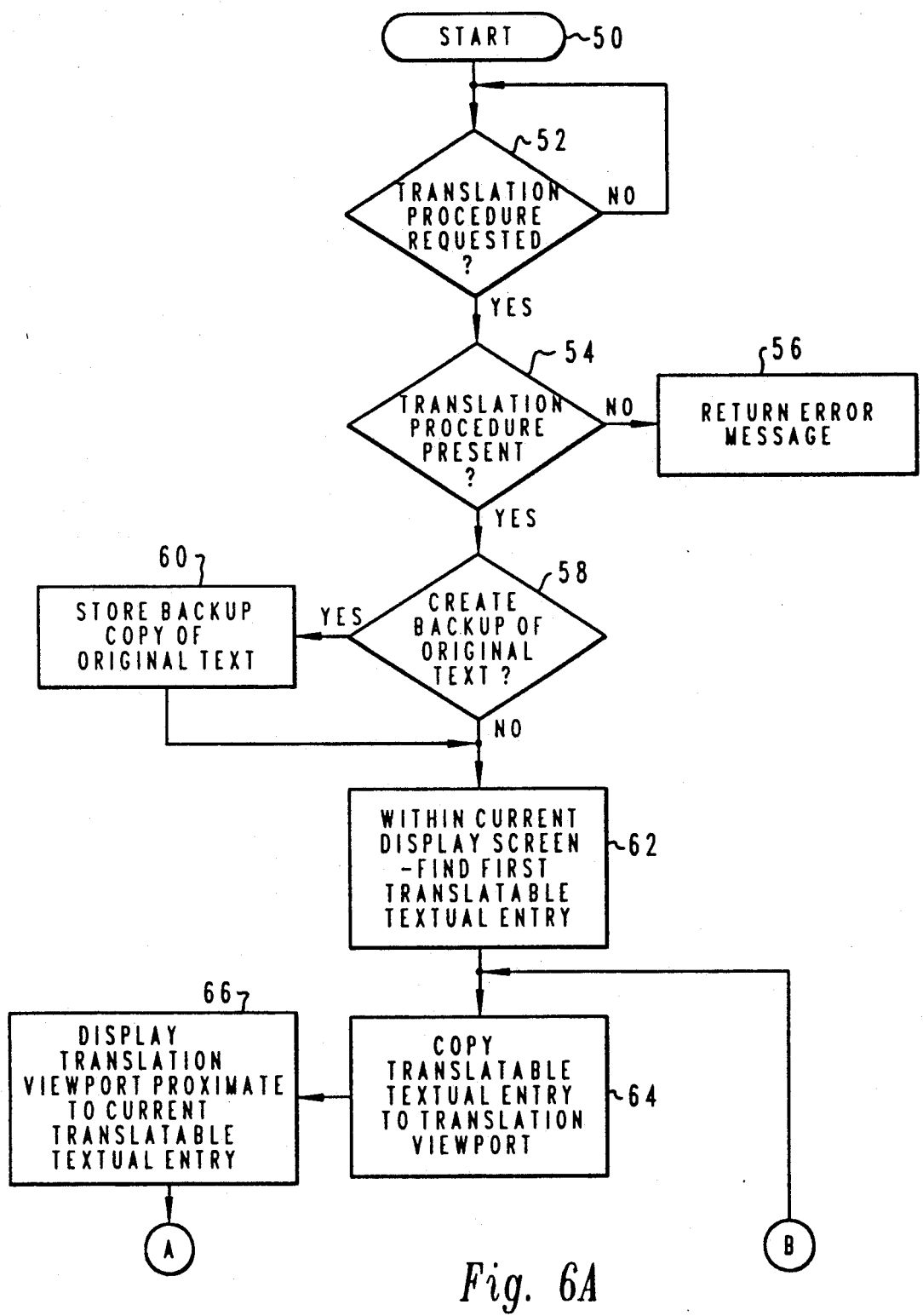
FIGS. 6a, 6b and 6c, when joined in the manner indicated, form a logic flowchart illustrating the contextual language translation of a textual entry within an interactive software application in accordance with the method and apparatus of the present invention.
Figure 6B:
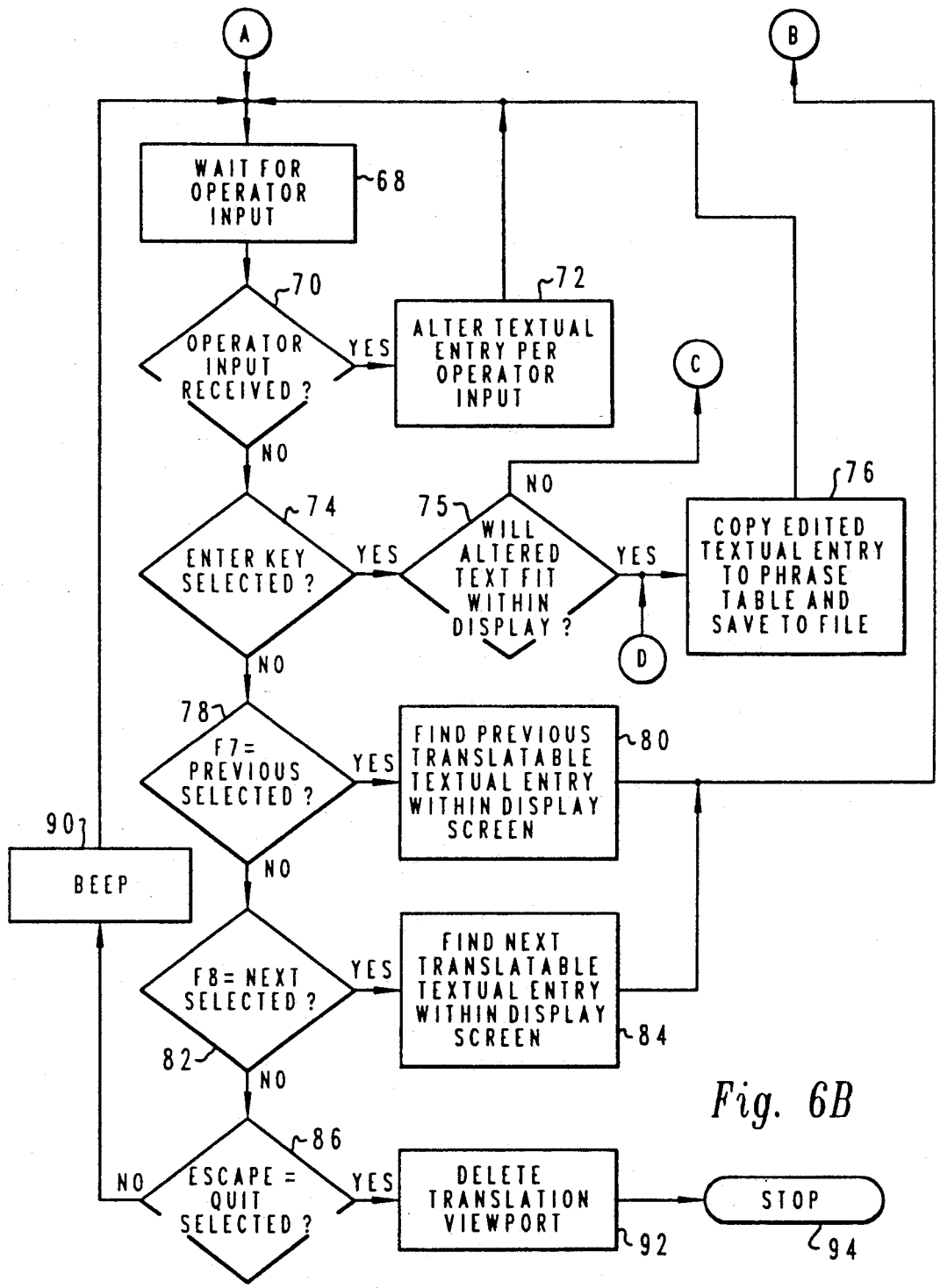
Figure 6C:
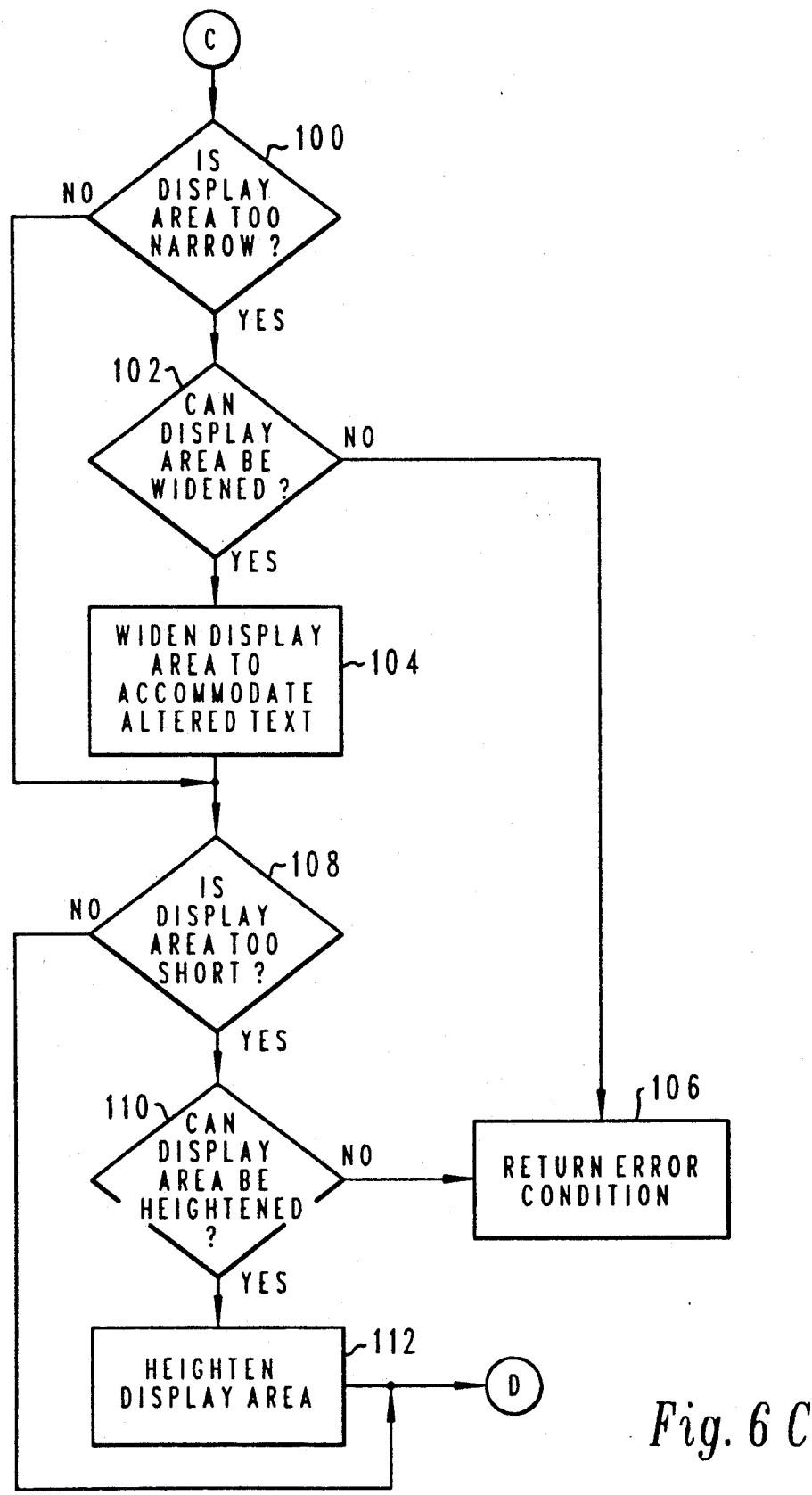

Referring now to FIGS. 6a, 6b, and 6c, there is depicted a logic flowchart which illustrates the contextual language translation of a contextual entry within an interactive software application in accordance with the method and apparatus of the present invention. During the description of FIGS. 6a, 6b, and 6c, reference will be made to FIGS. 2-5. As illustrated, the process begins at block 50 and thereafter passes to block 52 which depicts a determination of whether or not a translation procedure has been requested. Those skilled in this art will appreciate that the contextual translation procedure of the present invention may be invoked utilizing a specific sequence of keystrokes, and as a matter of manufacturing convenience, may be included within all copies of an interactive software application distributed for market without documenting this feature for ordinary users. Alternatively, it should be apparent that this feature may also be utilized to customize the textual entries within an interactive software application in accordance with the desires of a user without requiring translation into a second language. In the event no contextual translation procedure is requested, the process merely iterates until such time as a request is received.

In the event a contextual translation procedure is requested, as determined in block 52, then the process passes to block 54. Block 54 illustrates a determination of whether or not the contextual translation procedure is present or available for use within the interactive software application for which translation is sought. If not, the process passes to block 56 and an error message is returned to the user. However, in the event the translation procedure is present, the process passes to block 58 which illustrates a determination of whether or not the user desires to create a backup copy of the original text of the interactive software application. In the event a backup copy of the original text is desired, the process passes to block 60 which depicts the storing of a backup copy of the original text. Thereafter, or in the event no backup copy of the original text is desired, the process passes to block 62.

Block 62 depicts the finding of the first translatable textual entry within the current display screen. As referred to above, the interactive software application being translated is actually being executed within data processing system 10 (see FIG. 1) during the translation procedure such that the translator might readily observe the contextual meaning within various textual phrases as well as the physical size limitations of the phrase in question. By the phrase "translatable textual entry" what is meant is any reasonable word, group of words, or phrases which may be easily translated by a translator.

Next, block 64 depicts the copying of the translatable textual entry into translation viewport 36 (see FIGS. 3 and 4). Block 66 then illustrates the displaying of translation viewport 36 in a position proximate to the current translatable textual entry. In this manner, the translator may readily determine whether the translated phrase will meet the contextual and size requirements present within the display screen of the interactive software application.

Next, as depicted in block 68, the data processing system waits for operator input. Block 70 illustrates a determination of whether or not an editing input has been received from the user. By "editing input" what is meant is alphanumeric characters, cursor movement indications or other indications that the user desires to alter the content of translatable phrase field 38 (see FIGS. 3 and 4). If so, the process passes to block 72 which illustrates the altering of the textual entry in accordance with the operator input and the process then returns to block 68 to await additional operator input.

In the event no editing input has been received, as determined in block 70, the process then passes to block 74 which depicts a determination of whether or not the user has selected the enter key. Next, the process passes to block 75 which illustrates a determination of whether or not the altered text will fit within the display space provided. Those skilled in the art will appreciate that textual entries within an interactive software application may be listed within various columns, boxes, viewports or other physically limited spaces. Thus, it will be necessary to determine whether or not the altered text entered by a translator will fit within the appropriate display space. If not, the process passes to block 100 within FIG. 6c for automatic alteration of the display space in accordance with an important feature of the present invention. A discussion of the process contained within FIG. 6c will be contained below. However, in the event the altered text will fit within the display area allocated for that text, the process passes to block 66. Block 66 depicts the copying of the edited textual entry to the phrase table and saving that edited textual entry to the file. Thereafter, the process again returns to block 68 to await additional operator input.

In the event the operator has not selected the enter key, as determined in block 74, the process then passes to block 78. Block 78 illustrates a determination of whether or not the operator has selected the program function key labeled "F7" which, as indicated in command bar 40 of FIGS. 3 and 4, indicates the user's desire to select the previous translatable textual entry within display screen 18 In the event the user has selected program function key "F7" the process passes to block 80 which depicts the finding of the previous translatable textual entry within display screen 18. Thereafter, the process returns to block 64 and that translatable textual entry is copied into translation viewport 36 for processing in the manner described above.

Referring again to block 78 in the event the user has not selected program function key "F7" the process passes to block 82. Block 82 depicts a determination of whether or not the user has selected a program function key "F8" indicating the next translatable textual entry within display screen 18 is desired. If so, the process passes to block 84 which illustrates the finding of the next translatable textual entry within display screen 18 and the process again returns to block 64 as described above.

Next, in the event the user has not selected program function key "F8," as illustrated within command bar 40, block 86 depicts a determination of whether or not the user has selected the "escape" key, indicating his or her desire to terminate the translation function. The process then passes to block 90 which depicts the generation of an audible alarm to the user, indicating that the process awaits user input. Thereafter, the process returns to block 68 to await further operator input.

In the event the user has selected the "escape" key, indicating his or her desire to terminate the translation procedure the process passes to block 92. Block 92 illustrates the deleting of the translation viewport 36 from display screen 18 and display screen 18 is returned to the condition depicted within FIG. 5. Thereafter, as illustrated at block 94, the process terminates.

Referring now specifically to the section of the flowchart contained within FIG. 6c, the process by which the display area may be automatically modified to accommodate an altered textual phrase is illustrated. After determining that the altered text will not fit within the display area, as depicted within block 75, the process passes to block 100 which depicts a determination of whether or not the display area is too narrow to accommodate the phrase. If so, the process passes to block 102 for a determination of whether or not the display area may be automatically widened. That is, no physical constraints within the display screen prevent the automatic widening of the display area. If not, the process passes to block 106 which illustrates the returning of an error condition to the translator, indicating that manual intervention will be necessary in order to accommodate the altered text.

Referring again to block 102, in the event the display area can be widened automatically, the process then passes to block 104 which depicts the widening of the display area to accommodate the altered text. Thereafter, in the event the display area is not too narrow, as determined in block 100, or after widening the display area to accommodate the altered text, as illustrated in block 104, the process passes to block 108.

Block 108 depicts a determination of whether or not the display area to be utilized for the altered text is too short. If so, the process passes to block 100 which depicts a determination of whether or not the display area may be heightened. As above, in the event the display area cannot be automatically modified by increasing the height thereof, the process passes to block 106 which depicts the returning of an error condition, indicating that human intervention will be necessary to accommodate the altered text within the display screen. However, in the event the display area may be automatically heightened, the process then passes to block 112 which depicts the heightening of the display area. Thereafter, the process returns, via connector D to block 68 within FIG. 6b to await further operator input. Of course, those skilled in the art will appreciate that a display area may also be made smaller or narrower to accommodate a translated phrase, if appropriate.

Upon reference to the foregoing those skilled in the art will appreciate that the Applicants in the present application have created a novel method and apparatus whereby textual entries within an interactive software application may be translated into an alternate phrase or a foreign language during actual execution of the interactive software application, permitting contextual and size restrictions on the translation to be efficiently observed and automatically altering the display area for the translated text, if necessary. In this manner, a superior translation of the textual entries within an interactive software application may be created in a much shorter time. As utilized herein, the word "translation" shall also mean the substitution of an alternate phrase within a single language.

While the invention has been particularly shown and described with reference to a preferred embodiment, it will be understood by those skilled in the art that various changes in form and detail may be made therein without departing from the spirit and scope of the invention.

We claim:

1. A method for facilitating contextual translation of textual entries within an interactive software application executable within a data processor having a video output display and an operator input device, said textual entries displayed within a defined display area within said video output display, said method comprising steps of:
    loading a contextual translation procedure into said interactive software application;
    executing said interactive software application within said data processor;
    displaying within said video output display at least one textual entry within a defined display area during the execution of said interactive software application;
    invoking said contextual translation procedure utilizing said operator input device;
    utilizing said contextual translation procedure to permit an operator to input a translation of said at least one textual entry;
    displaying said input translation within said video output display in proximity to said at least one textual entry;
    determining if said input translation may be displayed within said defined display area utilizing said data processor;
    automatically altering an area within said defined display area to accommodate said input translation, if required; and
    substituting said input translation for said at least one textual entry within said interactive software application.

2. The method for facilitating contextual translation of textual entries within an interactive software application according to claim 1, wherein said step of invoking said contextual translation procedure utilizing said operator input device includes the step of displaying an input translation viewport within said video output device.

3. The method for facilitating contextual translation of textual entries within, an interactive software application according to claim 2, wherein said step of displaying said input translation within said video output display in proximity to said at least one textual entry comprises displaying said input translation within said input translation viewport.

4. The method for facilitating contextual translation of textual entries within an interactive software application according to claim 1, further including the step of storing a copy of said at least one textual entry prior to substituting said input translation.

5. The method for facilitating contextual translation of textual entries within an interactive software application according to claim 1, wherein said step of displaying within said video output display at least one textual entry within a defined display area comprises the step of displaying a plurality of textual entries and wherein invocation of said contextual translation procedure permits an operator to input a translation of each of said plurality of textual entries in sequential order.

6. A data processing system for facilitating contextual translation of textual entries displayed within a defined display area within an interactive software application executable within said data processing system, said data processing system comprising:
    means for loading a contextual translation procedure into said interactive software application;
    processor means within said data processing system for executing said interactive software application;
    video output display means coupled to said processor means for displaying at least one textual entry within a defined display area during execution of said interactive software application;
    operator input means coupled to said processor means for invoking said contextual translation procedure and for permitting an operator to input a translation of said at least one textual entry;
    display means coupled to said operator input means for displaying said input translation within said video output display in proximity to said at least one textual entry;

display control means coupled to said display means for determining if said input translation may be displayed within said defined display area and for automatically altering an area within said defined display area to accommodate said input translation, if required; and substitution means coupled to said processor means for substituting said input translation for said at least one textual entry within said interactive software application.

7. The data processing system for facilitating contextual translation of textual entries within an interactive software application according to claim 6, further including means for storing a copy of said at least one textual entry prior to substituting said input translation.

* * * * *